United States Patent [19]
Province

[11] 3,723,705
[45] Mar. 27, 1973

[54] FUSION HEATER

[75] Inventor: William F. Province, Bartlesville, Okla.

[73] Assignee: The Ridge Tool Company, Bartlesville, Okla.

[22] Filed: Jan. 17, 1972

[21] Appl. No.: 218,272

[52] U.S. Cl. ............................219/243, 219/535, 219/538
[51] Int. Cl. ...............................................H05b 1/00
[58] Field of Search ......219/243, 535, 538; 285/286, 285/423; 264/230; 156/158, 433, 503, 579

[56] References Cited

UNITED STATES PATENTS

| | | | |
|---|---|---|---|
| 3,013,925 | 12/1961 | Larsen | 285/423 X |
| 3,093,526 | 6/1963 | Price et al. | 264/230 X |
| 3,192,612 | 7/1965 | Elliott et al. | 219/243 UX |
| 3,378,672 | 4/1968 | Blumenkranz | 219/535 X |

*Primary Examiner*—C. L. Albritton
*Attorney*—James R. Head et al.

[57] ABSTRACT

An electrical fusion heater for heating the abutting ends of two plastic pipes to be joined in a plastic pipe fusion apparatus. The heater comprises a thick circular slab of good heat conductivity metal with an outer diameter greater than the diameter of the largest pipe size to be heated, and with a central opening smaller than the smallest pipe size to be heated. A plurality of heater elements are inserted into a corresponding plurality of radial openings along the central plane of the heater plate. A thermostatic switch is inserted into another opening in the central plane and connections between the power cable, the heater elements and the switch are made up in the central opening.

7 Claims, 3 Drawing Figures

PATENTED MAR 27 1973　　3,723,705

FUSION HEATER

CROSS REFERENCE TO RELATED APPLICATION

This application is related to my copending application entitled: Improved Facing Tool For Plastic Pipe Fusion Apparatus.

BACKGROUND OF THE INVENTION

This invention is in the field of plastic pipe fusion apparatus. More specifically, it is concerned with the design of a heating plate which is used for heating the opposed ends of the two pipes to be joined.

In the prior art the heater plates have been oversize requiring expensive construction to the heater and additional construction to the fusion joining apparatus. Also, there has been imperfect temperature distribution over the surface of the heater plate, causing variations in temperature of the pipes, with consequent imperfect joints.

SUMMARY OF THE INVENTION

This invention overcomes the weaknesses of the prior art design in several ways. First, it uses a plurality of equally spaced radial heater elements arranged in the central plane of the heater to provide good uniform temperature distribution over both faces of the heater plate. Secondly, it provides a central opening in the plate which is not used for heating since there is a minimum diameter of pipe which is to be heated by this device. This central opening space is utilized for making electrical connection between the power leads, the heaters, and the thermostatic switch. In the prior art all of these connections were made on the outer periphery of the heater which required a much larger diameter heater than was really necessary.

It is therefore an object of this invention to provide a heater plate with uniform distribution of temperature over its surfaces, the temperature being adjustable by means of a thermostatic switch and to provide a heater plate which is of minimum overall diameter and, specifically is only slightly larger in diameter than the largest pipe that is to be heated.

BRIEF DESCRIPTION OF THE DRAWINGS

These and other objects of this invention and a better understanding of the principles and details of the invention will be evident from the following description taken in conjunction with the appended drawings in which.

DESCRIPTION OF THE PREFERRED EMBODIMENT

Figure 2:
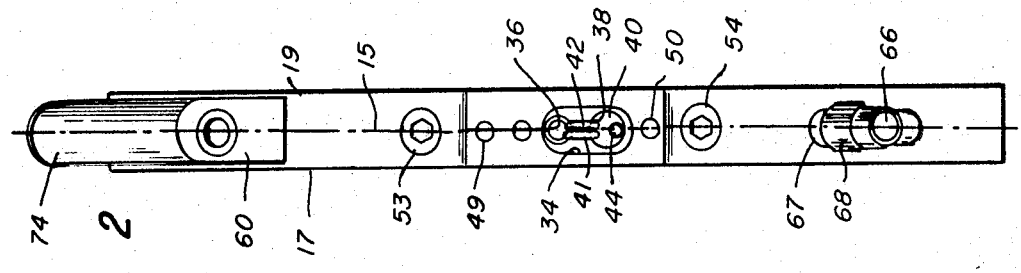
FIG. 2 shows an edge view of the embodiment of the invention.
Figure 1:
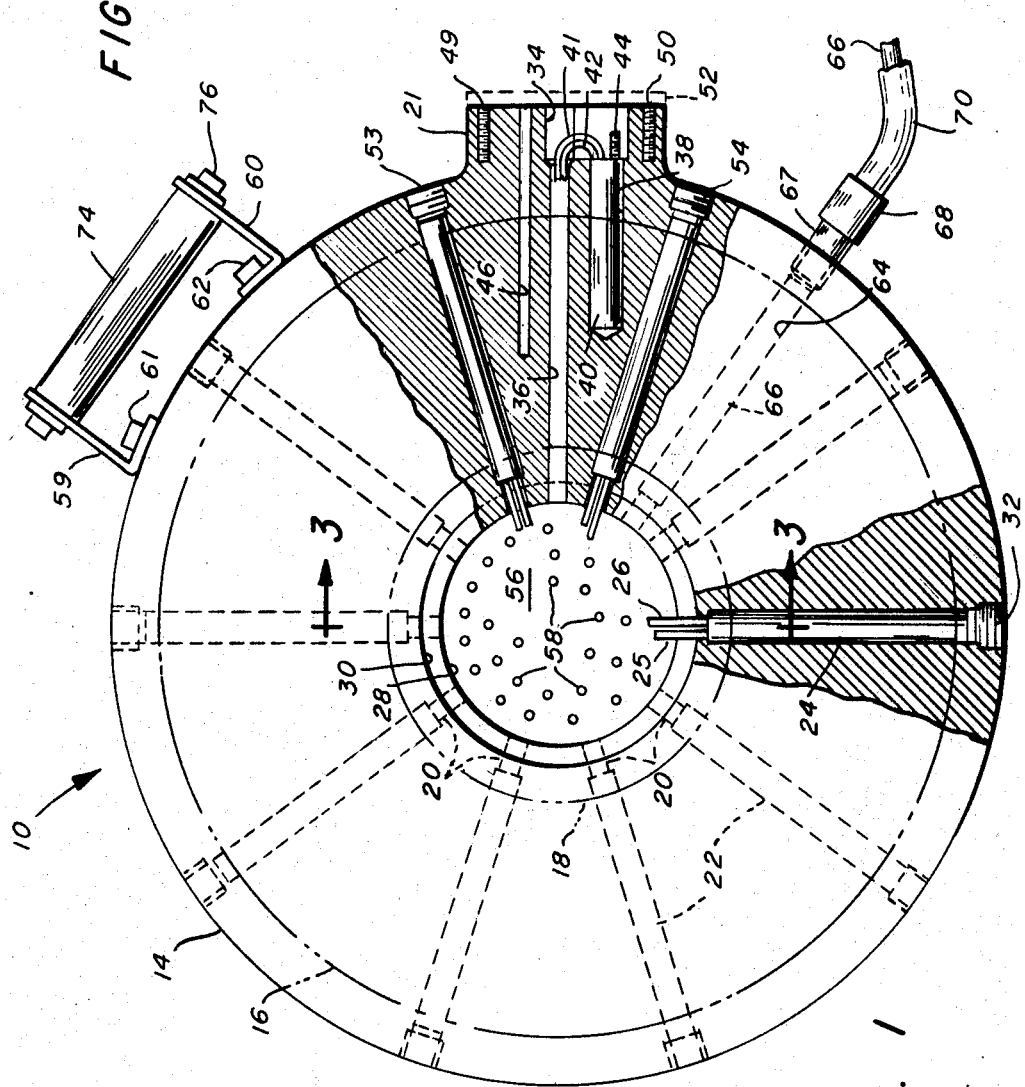
FIG. 1 shows in plan view one embodiment of this invention.

Referring now to the drawings, numeral 10 indicates generally the electrical fusion heater of this invention. It comprises a roughly circular slab of metal of good heat conductivity, such as aluminum. The two sides of the plate are smooth, plane, and parallel. There are a plurality of equally spaced radial openings 20 drilled along the central plane 15 of the heater plate. These extend from the outer circumferential surface 14 to the inner circumferential surface 28 of the central opening. A measured portion of these drill openings are enlarged, and preferably reamed, to a smooth contour of a precise diameter 22 such that will permit a snug heat-transmitting contact between the openings 22 and the metal-case heater elements 24 which are inserted into the openings. These metal-cased heater elements have a pair of leads 25 and 26 which are first inserted in the opening and pass down through the drilled portion 20 into the central opening area. Suitable plugs 32 are fastened into the outer ends of the radial openings so as to seal these openings against dirt and to retain the heaters in place.

There is an extension, or boss, 21 on one portion of the heater plate intermediate a pair of heater openings 53 and 54. There is a drilled hole 36 from the outer surface into the central opening. There is a larger opening 38 drilled and reamed to a shallower depth into which is inserted a metal-case thermostatic switch 40. The two leads 41 and 42 of this switch pass down through the opening 36 into the central opening 28. A control element 44 which is used to adjust the operating temperature of the thermostatic switch (or simply "thermostat") projects into a space 34 which is milled into the surface of the boss 21 to provide space for the control 44 and the leads 41, 42. A cover plate 52 is indicated by the dashed line 52 and can be held in place by screws fitted into the tapped holes 49 and 50.

In addition, a smaller diameter hole 46 is drilled into the plate into which a thermometer of conventional type can be inserted. This will be used to calibrate the setting of the thermostatic switch so that the temperature of the heating surface can be set to any desired value.

The outer diameter of the heater plate 14 is set to such a value that the pipe diameters ranging from an outer diameter 16 to a smaller diameter 18 will be in a region of the heated surface of the plate where the temperature distribution will be sufficiently uniform to ensure that good fusion of the pipe ends is provided.

Figure 3:
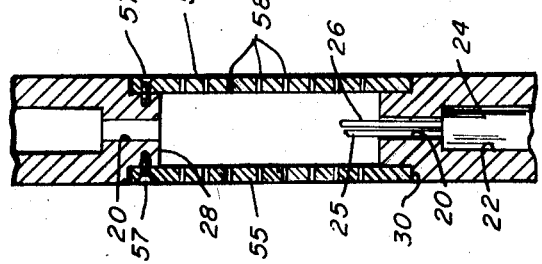
FIG. 3 shows in section a detail of the central opening portion of the embodiment taken along the line 3—3 of FIG. L.

The central opening has a counterbore 30 on each side, as shown in FIG. 3, and circular discs of metal can be inserted into the counterbore and held by screws such as 57. These are removed in order to gain access to the space for making up the connections between each of the heater elements, the thermostat leads and power leads 66, which are inserted in a radial opening 64. After the leads are connected the cover plates 56 and 55 are put in place and held by the screws 57. If desired, a plurality of drilled openings 58 may be provided in the cover plate to permit air passage into and out of the space and therefore to provide a cooling in this area of the heater. A fixture including a pipe 67, coupling 68 and flexible conduit 70 may be used to encase the power cable 66 which is inserted into the radial opening 64. The details of the power cable and fixtures are not important in this invention. A handle 74 received on bolt 76 is attached by means such as straps 59 and 60 held by screws 61 and 62 to the outer periphery of the heater to facilitate placement and removal of the heater between the two pipes. The details of the handle are likewise not critical to this invention.

It has been shown how, by utilizing the central opening space, all of the electrical connections can be made therein, and therefore the space on the outer periphery, where the connections are normally made in the prior art devices, can be saved. This results in a heater plate of outer diameter 14 only slightly gerater than the outer diameter 16 of the largest pipe to be heated. Also, by placing a plurality of identical heating elements equally spaced in a radial pattern, a very uniform temperature distribution will be provided.

While the invention has been described with a certain degree of particularity it is manifest that many changes may be made in the details of construction and the arrangement of components. It is understood that the invention is not to be limited to the specific embodiments set forth herein by way of exemplifying the invention but the invention is to be limited only by the scope of the attached claim or claims including the full range of equivalency to which each element or step thereof is entitled.

What is claimed:

1. In a plastic pipe fusion joining system for pipe sizes ranging in diameter from D1 to D2, a fusion heater, comprising:
   a. a circular plate of high thermal conductivity metal, the outer diameter greater than D2, and a central opening of diameter less than D1;
   b. a plurality of equally spaced radial openings from the outer circumference to the central opening along a central plane through said plate;
   c. a plurality of cartridge heater elements positioned one in each said opening, with their electrical leads leading into said central opening;
   d. a thermostatic switch inserted into a hole in said central plane; and
   e. radial conduit means in said central plane of said plate for electrical power leads to said central opening, the space in said central opening available for connecting said heater elements, said thermostatic switch and said electrical power leads.

2. The fusion heater as in claim 1 including plug means to seal the outer ends of said radial openings.

3. The fusion heater as in claim 1 including circular discs for closing said central opening.

4. The fusion heater as in claim 1 including handle means.

5. For use in plastic pipe fusion joining system for pipe sizes ranging in diameter from D1 to D2, a fusion heater, comprising:
   a. a circular plate of high thermal conductivity metal having opposed paralleled planar faces and an outer diameter greater than D2 and a central opening of a diameter less than D1, the circular plate having a radial conduit opening and a radial thermostatic switch lead opening, each opening extending from the outer circumference to the central opening and midway between the planar faces, the circular plate having a switch receiving opening therein communicating with the plate outer circumference
   b. a plurality of equally spaced radially positioned heater elements cast in said circular plate midway between said planar faces, each heater element having electrical leads leading into said central opening, said conduit and thermostatic switch openings being intermediate adjacent heater elements; and
   c. a thermostatic switch inserted into said thermostatic switch opening, said radial conduit opening providing means for receiving electrical power leads to said central opening, the space provided by said central opening being available for connecting said heater elements, said thermostatic switch and said electrical power leads.

6. The fusion heater as in claim 5 including circular discs for closing said central opening.

7. The fusion heater as in claim 5 including handle means.

* * * * *